US012070765B2

(12) United States Patent
Post et al.

(10) Patent No.: US 12,070,765 B2
(45) Date of Patent: Aug. 27, 2024

(54) ASSEMBLY FOR AND METHOD OF DISPENSING A LIQUID

(71) Applicant: Fast & Fluid Management B.V., Sassenheim (NL)

(72) Inventors: Johannes Hermanus Nicolaas Post, Sassenheim (NL); Marcel Engels, Voorhout (NL); Peter Ronald Krom, Katwijk (NL)

(73) Assignee: Fast & Fluid Management B.V., Sassenheim (NL)

( * ) Notice: Subject to any disclaimer, the term of this patent is extended or adjusted under 35 U.S.C. 154(b) by 0 days.

(21) Appl. No.: 15/510,830

(22) PCT Filed: Sep. 17, 2015

(86) PCT No.: PCT/EP2015/071375
§ 371 (c)(1),
(2) Date: Mar. 13, 2017

(87) PCT Pub. No.: WO2016/042104
PCT Pub. Date: Mar. 24, 2016

(65) Prior Publication Data
US 2017/0252766 A1    Sep. 7, 2017

(30) Foreign Application Priority Data

Sep. 17, 2014   (EP) .................................. 14185202

(51) Int. Cl.
*B65B 1/04*      (2006.01)
*B01F 25/50*     (2022.01)
(Continued)

(52) U.S. Cl.
CPC ............ *B05B 15/531* (2018.02); *B01F 25/50* (2022.01); *B01F 33/841* (2022.01);
(Continued)

(58) Field of Classification Search
CPC .......... B01F 15/00001; B01F 15/00246; B01F 15/0283; B01F 15/0292; B01F 13/1058;
(Continued)

(56) References Cited

U.S. PATENT DOCUMENTS 2,985,339 A      5/1961  Fischer et al.
3,115,896 A  *  12/1963  Roberts ................. F16K 11/085
                                                      137/556.6
(Continued)

FOREIGN PATENT DOCUMENTS

CN         1643280 A      7/2005
CN       101528588 A      9/2009
(Continued)

OTHER PUBLICATIONS

International Search Report for related International Application No. PCT/EP2015/071375; report dated Feb. 12, 2016.

*Primary Examiner* — Charles P. Cheyney
(74) *Attorney, Agent, or Firm* — Tucker Ellis LLP; Michael G. Craig

(57) ABSTRACT

Assembly for dispensing a liquid, in particular a colorant for paint, comprising a container for holding a liquid, a pump, a valve, at least one dispense opening, and comprising or associated with a controller arranged to operate the pump and the valve to withdraw liquid from the container and to dispense liquid via the opening and to operate the pump and the valve to purge liquid from the pump to the container via the dispense opening.

13 Claims, 2 Drawing Sheets

(51) Int. Cl.
  *B01F 33/841* (2022.01)
  *B01F 35/12* (2022.01)
  *B01F 35/21* (2022.01)
  *B01F 35/75* (2022.01)
  *B01F 35/88* (2022.01)
  *B05B 15/531* (2018.01)
  *B01F 101/30* (2022.01)

(52) U.S. Cl.
  CPC ........ *B01F 35/122* (2022.01); *B01F 35/2136* (2022.01); *B01F 35/7544* (2022.01); *B01F 35/7547* (2022.01); *B01F 35/8822* (2022.01); *B01F 2101/30* (2022.01)

(58) Field of Classification Search
  CPC ............ B05B 15/0275; G05D 16/2066; F16K 11/085; F16K 11/0876; F04B 15/02
  USPC ............... 222/135, 144, 144.5, 380; 251/207
  See application file for complete search history.

(56) References Cited

U.S. PATENT DOCUMENTS

| | | | | |
|---|---|---|---|---|
| 5,356,041 A * | 10/1994 | Hellenberg | ......... | B01F 13/1058 141/103 |
| 5,983,937 A * | 11/1999 | Makihara | ........... | B60H 1/00485 137/624.15 |
| 5,992,686 A * | 11/1999 | Cline | ..................... | B29B 7/603 222/1 |
| 6,811,058 B2 * | 11/2004 | Voskuil | ............... | F16K 11/0876 222/135 |
| 7,029,164 B2 * | 4/2006 | Linsen | ................ | B01F 13/1055 366/152.1 |
| 7,267,531 B2 * | 9/2007 | Anderson | .......... | F04B 43/1253 222/14 |
| 7,631,788 B2 * | 12/2009 | Litterst | .................. | B67D 1/102 222/1 |
| 7,644,840 B2 * | 1/2010 | Held | .................. | B01F 13/1058 222/135 |
| 8,813,793 B2 * | 8/2014 | Boboltz | ............. | B01F 15/0445 141/104 |
| 9,016,519 B2 * | 4/2015 | Minard | .................... | B67D 1/10 222/56 |
| 2003/0183654 A1 | 10/2003 | Voskuil et al. | | |
| 2006/0076080 A1 * | 4/2006 | Salas | .................. | B01F 13/1055 141/104 |
| 2012/0250451 A1 | 10/2012 | Post et al. | | |
| 2014/0326322 A1 * | 11/2014 | Schutze | ................ | G01F 11/029 137/7 |
| 2016/0138393 A1 * | 5/2016 | Kyllingstad | ....... | G01N 33/2823 73/152.04 |

FOREIGN PATENT DOCUMENTS

| | | |
|---|---|---|
| CN | 103968106 A | 8/2014 |
| WO | 2007070037 A1 | 6/2007 |

* cited by examiner

ASSEMBLY FOR AND METHOD OF DISPENSING A LIQUID

CROSS-REFERENCE TO RELATED APPLICATIONS

This application is a 35 USC § 371 U.S. national stage filing of International Patent Application No. PCT/EP2015/071375 filed on Sep. 17, 2015, which claims priority under the Paris Convention and 35 USC § 119 to European Application No. EP 14185202.0 filed on Sep. 17, 2014.

FIELD OF THE DISCLOSURE

The invention relates to an assembly for and a method of dispensing a liquid, in particular a colorant for paint.

BACKGROUND OF THE DISCLOSURE

EP 1 492 970 relates to a valve assembly for a fluid dispenser, which includes a housing having at least a first opening and a second opening, a valve member fitted in the housing, the valve member being rotatable about an axis and comprising a first channel, extending along said axis and communicating with the first opening in the housing, and at least two outlet channels radially extending from the first channel to the circumference of the valve member, wherein each of the radially extending outlet channels can be brought in register with the second opening by rotating the valve member.

EP 1 688 652 relates to a similar valve assembly, wherein at least one of said housing and said valve member is made of a synthetic material and the assembly further comprises a spring, which urges the valve member towards or onto an inner wall of the housing.

U.S. Pat. No. 2,985,339 relates to a dispenser for metering predetermined quantities comprising a valve member (indicated by numeral 36 in the Figures of U.S. Pat. No. 2,985, 339). "Valve member 36, in the normal rest position illustrated in FIG. 6, has recess 36a in its outer cylindrical surface opposite discharge opening 35 . . . valve member 36 has two radial valve passages 54 and at right angles to each other and intersecting at the axis of the valve member."

US 2012/250451 relates to a method of homogenizing a liquid, in particular a colorant for paint, in a container, comprising the steps of withdrawing liquid from the container at a first flow speed (S1) and then returning the liquid to the container at a second flow speed (S2), higher than the first flow speed (S1).

In e.g. colorant dispensers for paint, purging, i.e. dispensing a small amount of colorant to clean the dispense opening and thus reduce the risk of so-called mistints resulting from nozzle blockage e.g. caused by colorant drying in the dispense opening, is a common and effective practice. However, purging implies waste of colorant.

It is an object of the present invention to provide effective cleaning of the dispense opening and yet reduce or prevent such waste.

SUMMARY OF THE DISCLOSURE

The invention relates to an assembly comprising a container for holding a liquid, a pump, a valve, at least one dispense opening, i.e. an opening that, at least during dispensing, communicates with the outside of the pump to dispense liquid from the assembly and into e.g. a receptacle, and comprises or is associated with a controller arranged to operate the pump and the valve to withdraw liquid from the container, to dispense liquid via the opening and to operate the pump and the valve to purge liquid from the pump to the container via the dispense opening.

In an embodiment, the assembly comprises at least one further dispense opening, e.g. having a diameter different from the diameter of the first dispense opening, e.g. smaller to allow more accurate dispensing or larger to allow faster dispensing, and wherein the controller is arranged to operate the pump and the valve to purge liquid from the pump to the container via the at least one further dispense opening, preferably via all dispense openings in succession. In another embodiment, the valve, in a first position, connects the container to the pump and, in a second or further position, connects the pump to the or a dispense opening.

In a further embodiment, the valve comprises a rotatable valve member, e.g. a valve ball, cylinder or disc, and the dispense opening or openings is respectively are defined in the valve member, e.g. as a channel or channels that extends respectively extend radially or axially in the valve member. Thus, the liquid is dispensed directly from the valve member, e.g. through a larger opening in the valve, e.g. in the housing of the valve, preferably preventing the liquid from contacting the larger opening.

With the present invention the dispense opening can be cleaned by the purging with colorant itself and yet, because the purged colorant is returned to the container, waste is reduced or prevented altogether.

In a refinement, the openings are all located within 120°, preferably within 110°, of rotation of the valve member from each other. Thus, total rotation required to purge all openings is limited and operation facilitated.

The controller can be integrated with the other parts of in the assembly or e.g. associated with the other parts, e.g. positioned at a dispense position and coupled with the other parts when these are at the dispense position.

In a further embodiment, which can be used outside the context of purging as described above, in a position of the valve, at least the pump is closed and the controller is arranged to establish, preferably by measuring the compressibility or expandability of the medium e.g. by measuring resistance in or stroke of the pump, whether and, if so, to what extent the medium contains air. In a refinement, in a position of the valve, all suction and dispense openings and routes are closed.

If the liquid inside the pump allows more compression or expansion than the liquid as such, this is an indication that the liquid contains air. The liquid may contain air as a result of e.g. production or mixing of the liquid or of an empty container, refilling of a container, or a leaking seal in the assembly. The degree of displacement provides an indication of the root cause. Pump condition and/or container filling status can be registered and communicated to the operator and/or service representative e.g. by means of signals and/or a log.

In a further embodiment, the valve comprises a variable opening and/or a plurality of different openings and the controller is arranged to establish whether flow resistance in the liquid over the opening. This can be achieved e.g. by accurately controlling the valve and/or shaping the openings, e.g. oval, diamond or oblong, to vary overlap between internal openings and/or providing two or more channels having different diameters and/or different effective cross-sections and thus set flow resistance, This provides a means for determining the condition of the liquid, e.g. by measuring flow resistance from the control of motor driving the pump, e.g. at different openings or overlaps. Overlap and/or shape and/or surface and/or length (in flow direction) of the opening will affect the shear in the liquid and e.g. for shear thinning and/or shear thickening liquids this will provide information whether a certain viscosity yield value is still present, which can serve as an indication of the condition of the liquid.

Measurements of (parameters indicative of) compressibility, expandability or flow resistance can be performed automatically, e.g. periodically and/or outside business hours, and a signal generated to inform an operator or service representative.

In another embodiment, the controller is arranged to purge the dispense opening(s) and perform said measurements automatically, e.g. periodically and/or outside business hours.

In a further embodiment, the pump is a positive displacement pump, preferably a reciprocating pump, preferably a piston pump.

The invention further relates to a method of dispensing a liquid, in particular a colorant for paint, from an assembly comprising a container holding a liquid, a pump, a valve, and at least one dispense opening, comprising the steps of withdrawing liquid from the container and dispense the liquid from the dispense opening, and characterised by purging liquid from the pump to the container via the dispense opening.

In an embodiment, the assembly comprises a further dispense opening and wherein liquid is purged from the pump to the container via the further dispense opening.

In another embodiment, the pump is closed by means of the valve and the degree of compressibility or expandability of the liquid in the pump is established.

In a further embodiment comprises varying an opening, e.g. between the pump and the container, generating a flow of the liquid through different openings and establishing flow resistance in the liquid over the different openings.

Within the framework of the present invention the term "liquid" is defined as any flowable material that comprises a liquid phase and thus includes suspensions and emulsions. Colorants often contain high density pigments or particles suspended in (instable) liquid binder/solvent solutions.

BRIEF DESCRIPTION OF THE DRAWINGS

The disclosed invention will be further explained with reference to the accompanying drawings in which presently preferred embodiments of the invention are shown schematically.

DETAILED DESCRIPTION OF THE DISCLOSURE

Figure 1:
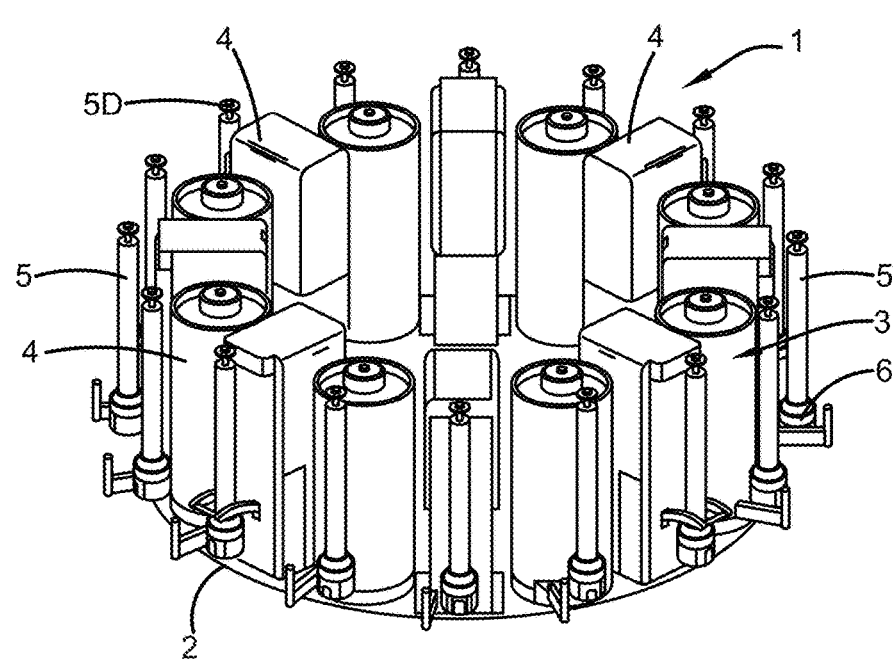
FIG. 1 is a perspective view of a part of a disclosed apparatus for dispensing viscous liquid.

FIG. 1 illustrates the main parts of an example of an apparatus 1 for dispensing viscous liquids, such as colorants or dyes. This particular dispensing apparatus includes a turntable 2 rotatable about a vertical axis by means of a drive (not shown) in order to rotate the turntable 2 between discrete positions. On the turntable 2, there are mounted a plurality of assemblies 3, each comprising a container 4 for holding a liquid, pump 5, and a valve 6. Further details of the said apparatus and turntable are disclosed in U.S. Pat. No. 6,273,298, the contents of which are incorporated herein by reference.

Figure 2:
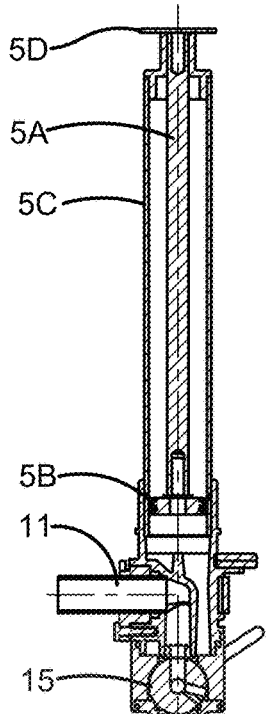
FIG. 2 is cross-sectional side view of a disclosed valve assembly suitable for use in the apparatus of FIG. 1.
Figure 3:
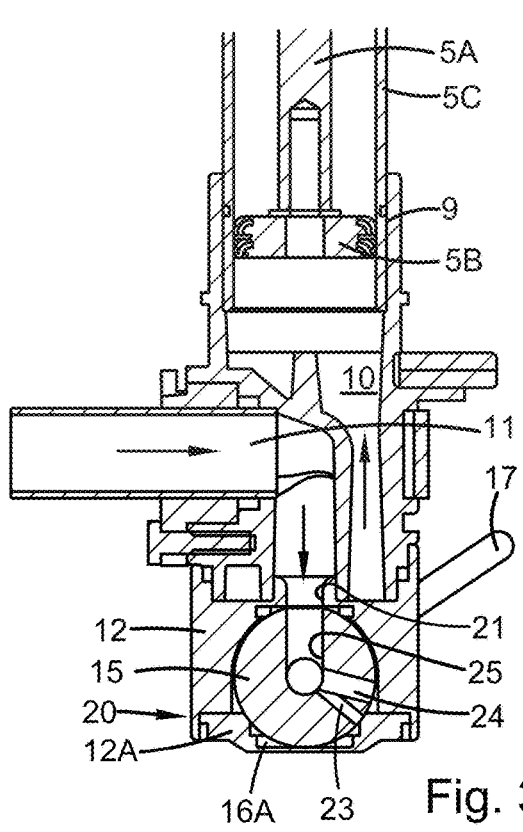
FIG. 3 is a partial detailed view of the valve assembly of FIG. 2.
Figure 4:
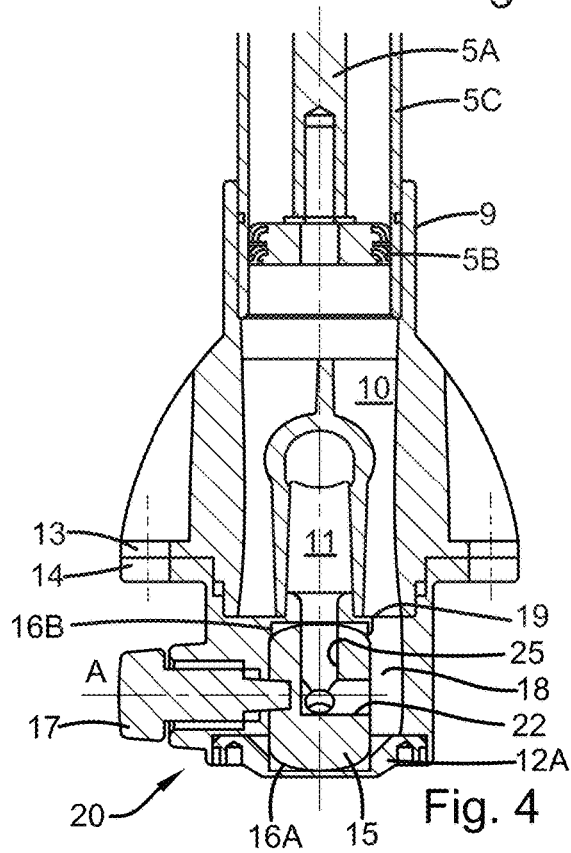
FIG. 4 is a cross-sectional front view of the valve assembly as shown in FIG. 3.

FIGS. 2 to 4 show cross-sections of the pump 5 and valve 6. The pump 5 is a piston pump and includes a piston rod 5A provided with a piston 5B, disposed within a cylinder 5C of the pump 5, and an upper flange 5D. The flange 5D can be engaged by a controller 7 comprising an actuator (not shown) adapted to move the piston rod 5A and the piston 5B upwards during an intake stroke and downwards during a dispense stroke and an actuator (not shown) to operate the valve 6.

The controller 7 and actuators are stationary and arranged to position one of the assemblies 3 in line with the actuators in order to enable actuating the pump 5 and the valve 6. The cylinder 5C is mounted in the top part of a pump housing 9, which defines a cavity 10 and further includes an inlet channel 11 that is separated from the cavity 10 and adapted to be in fluid communication with a container 4 as shown in FIG. 1.

A valve housing 12, comprising a cover 12A, is attached to the lower part of the pump housing 9 by means of respective flanges 13, 14. A valve member, in this example a ball 15, is fitted in the housing 12 by means of two annular bearings 16A, 16B made of, e.g., a polymeric material, such as PTFE (Teflon). The valve member 15 is provided with a lever 17 with which it can be rotated about an axis A by means of the corresponding actuator. The valve housing 12 further defines a cavity 18 limited at its upper part by a first opening 19, through which the cavity 18 communicates with the cavity 10 of the pump housing 9. The valve housing 12 further includes a second opening 20 in its bottom part and a third opening 21 which communicates with the inlet channel 11 in the pump housing 9. The valve member 15 includes a first channel 22, extending along the axis A and communicating with the first opening 19 in the housing 12. It further includes at least two dispense openings, in this example in the form of outlet channels 23, 24, and an inlet channel 25, all radially extending from the first channel 22 to the circumference of the valve member 15. In this particular embodiment, the diameter of one of the outlet channels 23 is smaller than that of the other 24 and the diameter of both outlet channels 23, 24 is smaller than that of the inlet channel 25. Further, both of these diameters are smaller than the diameter of the outlet opening 20 in the housing 12 and the central axes of channels 23-25 are all located on the same sectional plane through the valve member 15 and are respectively, e.g., 30° C. and 100° C. apart.

FIGS. 2 to 4 show the intake position of the valve member, where the inlet channel 25 of the valve member 15 is in registry with the third opening 21 of the valve housing 12 and thus with the inlet channel 11. In other words, the container communicates with the cavity 10 in the pump housing 9 and the cylinder 7. In this position, the cavity 10 and cylinder 7 now can be filled with a desired amount of the liquid from the container by moving the piston 6 upwards over a desired or predetermined length. It is noted that, in this position, the inlet channel 22 temporarily serves as an outlet channel.

As soon as an appropriate amount of liquid is taken in, the valve member 15 can be rotated to the desired dispensing position, i.e., until the desired dispense channel 23, 24 is in register with the opening 20 in the housing and the piston 6 can be moved downwards to dispense a desired or predetermined amount from the said opening 20. If this amount of liquid is relatively small and/or the dosage should be precise, the relatively narrow output channel 23 is appropriate and, if this amount is relatively large and/or should be dispensed rapidly, the relatively wide output channel 24 is appropriate. Thus, the valve assembly enables the tailored and, if need be, precise and/or rapid dispensing of viscous liquids, without having to exchange the valve assembly or components of the valve assembly.

Figure 5A:
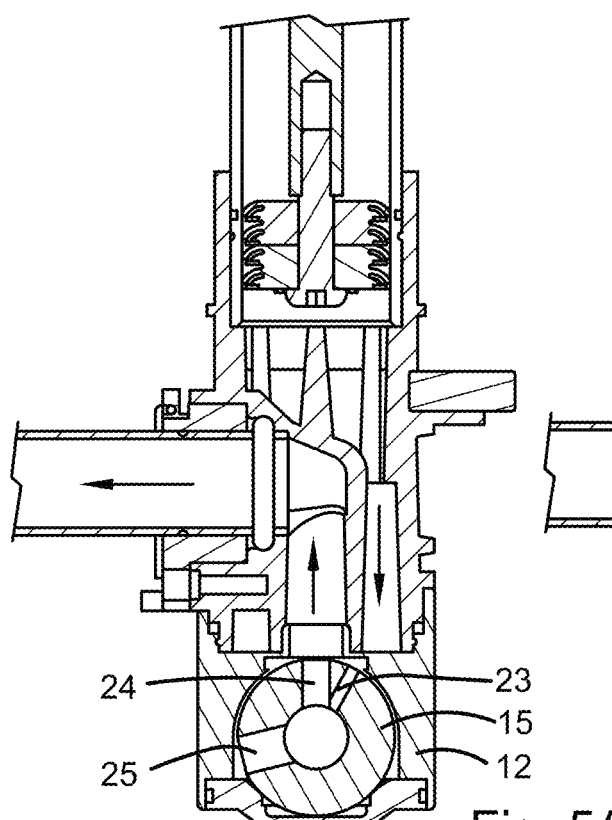
FIGS. 5A and 5B show the same detail as FIG. 3 at different positions of the valve.
Figure 5B:
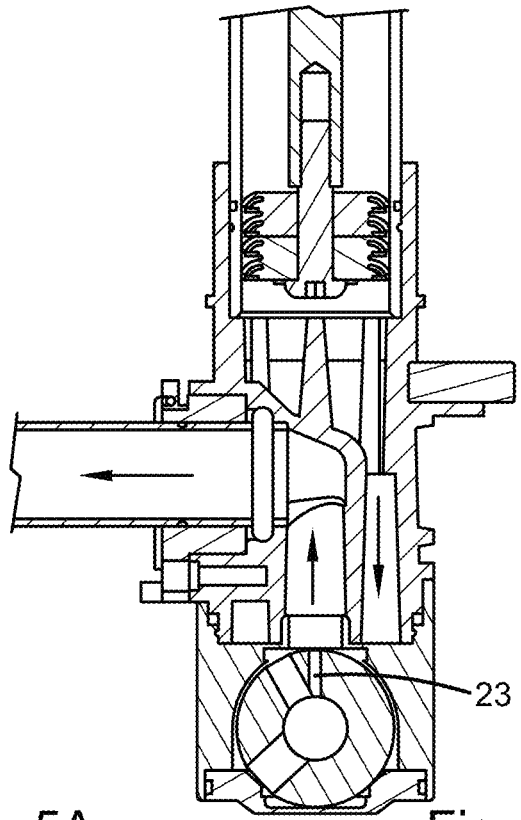

During purging, shown in FIGS. 5A and 5B, the valve member 15 is rotated until the desired dispense channel—the larger diameter channel in FIG. 5A and the smaller diameter channel in FIG. 5B—to be purged is in register with the third opening 22 in the housing 12, which communicates with container 4. In these positions, the piston 6 is moved downwards to purge a predetermined amount of liquid through the dispense channel back to the container 4.

Figure 6:
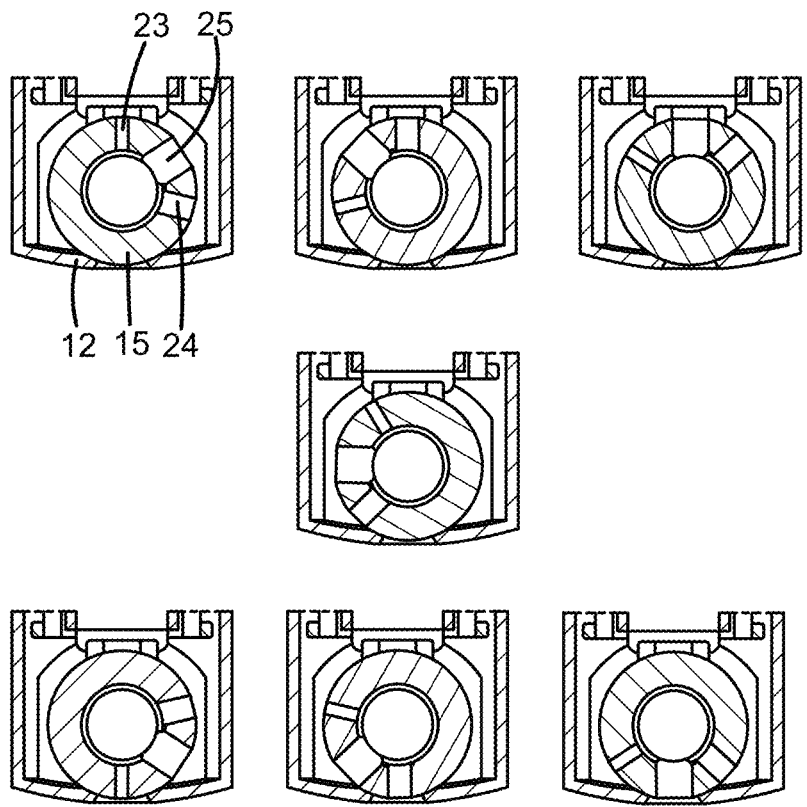
FIG. 6 shows part of a further embodiment comprising a different valve at seven positions.

FIG. 6 shows a further embodiment of a valve according to the present invention in seven positions. In this embodiment, the radial dispense channels 23, 24 are 108° apart and the intake channel 25 is positioned in between the dispense channels. The positions are, in succession, intake or return of liquid via the intake channel 25, purging the larger diameter dispense channel 24 by returning liquid to the container, purging the smaller diameter dispense channel 23 by returning liquid to the container, closing the pump from all suction and dispense openings and routes fluid, dispensing via the smaller diameter dispense channel 23, dispensing via the larger diameter dispense channel 24, and dispensing via the intake channel 25.

As a matter of course, the invention is not restricted to the above-disclosed embodiment and can be varied in numerous ways within the scope of the claims.

The invention claimed is:

1. An apparatus for dispensing liquid colorants for tinting paints, the apparatus comprising a plurality of assemblies each with an outlet opening, each assembly comprising:
   a container for holding a liquid colorant;
   a piston pump with a pump cylinder and a piston;
   a plurality of dispense openings:
   a valve selectively movable from a first position connecting the container to the pump cylinder, a second position connecting the pump cylinder to one of the plurality of dispense openings, and a third position closing off the pump; and
   a controller to operate the pump and the valve during a dispense cycle in order to withdraw liquid colorant from the container and to dispense liquid colorant through the at least one of the plurality of dispense openings;
   wherein the controller is configured to establish outside a dispense cycle whether the liquid colorant contains air based at least on a measurement of compressibility or expandability of the liquid colorant, the measurement of compressibility or expandability established by the controller during a stroke of the pump when the valve is closed in the third position, and subsequently the controller generates a signal to an operator based on the measurement.

2. The apparatus according to claim 1, wherein the controller is arranged to operate the pump and the valve to purge liquid colorant from the pump to the container via another of the at least one plurality of dispense openings.

3. The apparatus according to claim 1, wherein the valve of each one of the assemblies comprises a rotatable valve member and the at least one of the plurality of dispense openings is/are disposed in the valve member.

4. The apparatus according to claim 3, wherein each of the plurality of dispense openings are all located within 120° of rotation of the valve member from each other.

5. The apparatus according to claim 1, wherein the valve of each assembly, in the third position, closes the pump and wherein the controller is arranged to establish whether the medium inside the pump is compressible or expandable.

6. The apparatus according to claim 1, wherein the valve of each assembly comprises the plurality of dispense openings, each of the plurality of dispensing openings being different from the other of the plurality of dispense openings, and wherein the controller is arranged to establish whether flow resistance in the liquid colorant over each of the plurality of dispense openings.

7. The apparatus according to claim 1, wherein the controller comprises a memory programmed to purge the at least one of the plurality of dispense openings of each assembly automatically.

8. The apparatus according to claim 1, wherein the pump of each assembly is a positive displacement pump.

9. A method of checking pump condition, colorant condition and container filling status outside a dispense cycle with an assembly comprising a container holding a liquid colorant, a controller, a piston pump having a pump cylinder and piston, a plurality of dispensing openings, a valve that is selectively movable from a first position connecting the container to the pump cylinder, to a second position connecting the pump cylinder to one of the plurality of dispense openings, and to a third position closing off the pump, the method comprising the steps of:
   disposing the valve in the third position;
   initiating a stroke of the pump;
   using the pump stroke to obtain a measurement of compressibility or expandability of the liquid colorant during the stroke of the pump, and using the controller to identify whether the liquid colorant contains air based at least on the measurement of compressibility or expandability of the liquid colorant, and then the controller operates the pump and the valve to purge liquid from the pump to the container through one of the plurality of dispense openings, and subsequently the controller generates a signal to an operator based on the measurement.

10. The method according to claim 9, wherein liquid colorant is purged from the pump to the container via another of the at least one plurality of dispense openings.

11. The method according to claim 9, further comprising each of the plurality of dispensing openings being different than the other of the plurality of dispense openings and generating a flow of the liquid colorant through each of the plurality of dispense openings and establishing flow resistance of the liquid colorant through each of the different plurality of dispense openings.

12. The method according to claim 9, comprising purging the liquid colorant from at least one of the plurality of dispense openings automatically.

13. An assembly for dispensing a liquid, comprising:
   a container for holding a liquid;
   a pump;
   a valve comprising one or more openings, the shape and/or number of the openings being variable to vary a set flow resistance;
   at least one dispense opening, and a controller to operate the pump and the valve in order to withdraw liquid from the container and to dispense liquid through the opening, and the controller operating the pump and the valve to purge liquid from the pump through the dispense opening;

the controller being configured to select a shape and/or number of the openings of the valve to vary a set flow resistance;

the controller further configured to measure flow resistance with the selected shape and/or number of openings of the valve;

the controller is further configured to establish a condition of the liquid by comparing the set flow resistance and the measured flow resistance of the liquid with the selected shape or number of openings.

* * * * *